US009551220B2

(12) United States Patent
Fuqua et al.

(10) Patent No.: US 9,551,220 B2
(45) Date of Patent: Jan. 24, 2017

(54) OPEN INTAKE AND EXHAUST CHAMBER CONSTRUCTIONS FOR AN AIR HANDLING SYSTEM OF AN OPPOSED-PISTON ENGINE

(71) Applicant: Achates Power, Inc., San Diego, CA (US)

(72) Inventors: Kevin B. Fuqua, San Diego, CA (US); John J. Koszewnik, San Diego, CA (US); Suramya D. Naik, San Diego, CA (US); Fabien G. Redon, San Diego, CA (US); Gerhard Regner, San Diego, CA (US); Rodrigo Zermeño Benitez, San Diego, CA (US)

(73) Assignee: ACHATES POWER, INC., San Diego, CA (US)

( * ) Notice: Subject to any disclaimer, the term of this patent is extended or adjusted under 35 U.S.C. 154(b) by 233 days.

(21) Appl. No.: 14/284,134

(22) Filed: May 21, 2014

(65) Prior Publication Data

US 2015/0337728 A1    Nov. 26, 2015

(51) Int. Cl.
| | |
|---|---|
| *F02B 75/20* | (2006.01) |
| *F02B 75/28* | (2006.01) |
| *F02B 25/08* | (2006.01) |
| *F02B 47/08* | (2006.01) |
| *F01B 7/14* | (2006.01) |
| *F02M 35/104* | (2006.01) |
| *F02M 35/10* | (2006.01) |
| *F02M 35/112* | (2006.01) |
| *F01N 13/10* | (2010.01) |

(52) U.S. Cl.
CPC ............. *F01B 7/14* (2013.01); *F01N 13/105* (2013.01); *F02B 75/282* (2013.01); *F02M 35/1015* (2013.01); *F02M 35/1045* (2013.01); *F02M 35/10157* (2013.01); *F02M 35/10222* (2013.01); *F02M 35/112* (2013.01)

(58) Field of Classification Search
USPC ... 60/605.2; 123/51 R, 51 B, 51 BA, 51 BB, 123/51 BC, 46 R, 46 SC, 52.2, 568.11, 568.12, 123/568.14, 257, 41.39, 65 PD, 65 PE, 65 P
See application file for complete search history.

(56) References Cited

U.S. PATENT DOCUMENTS

| | | | |
|---|---|---|---|
| 1,517,634 A | 9/1920 | Junkers | |
| 2,295,879 A * | 9/1942 | Tucker | ............... F01B 7/12 123/51 BB |

(Continued)

FOREIGN PATENT DOCUMENTS

| | | |
|---|---|---|
| GB | 364395 A | 1/1932 |
| WO | WO-2013/093501 A1 | 6/2013 |
| WO | WO 2013/126347 A1 | 8/2013 |

OTHER PUBLICATIONS

International Search Report and Written Opinion for PCT application PCT/US2015/029038, mailed Jul. 20, 2015.

(Continued)

*Primary Examiner* — Thai Ba Trieu
*Assistant Examiner* — Deming Wan
(74) *Attorney, Agent, or Firm* — Terrance A. Meador

(57) ABSTRACT

An opposed-piston engine has a cylinder block with a plurality of cylinders arranged inline, with each cylinder including an intake port longitudinally separated from an exhaust port. The engine's air handling system includes open intake and exhaust chambers in the cylinder block. The open chamber constructions eliminate the need for multi-pipe manifolds and smooth the flow of charge air.

19 Claims, 14 Drawing Sheets

(56) References Cited

U.S. PATENT DOCUMENTS

| | | | |
|---|---|---|---|
| 3,023,743 A | | 3/1962 | Schauer, Jr. |
| 4,071,000 A | | 1/1978 | Herbert |
| 4,269,158 A | | 5/1981 | Berti |
| 4,714,056 A | * | 12/1987 | Tottori .................... F02B 27/06 123/65 EM |
| 5,515,817 A | | 5/1996 | Nurmi et al. |
| 6,026,775 A | | 2/2000 | Yamane |
| 6,227,179 B1 | | 5/2001 | Eirmann et al. |
| 6,619,275 B2 | | 9/2003 | Wilk |
| 6,976,479 B1 | | 12/2005 | Gottemoller et al. |
| 8,286,615 B2 | | 10/2012 | Dehnen et al. |
| 8,549,854 B2 | * | 10/2013 | Dion ....................... F02F 1/186 123/46 R |
| 8,671,919 B2 | | 3/2014 | Nakasugi et al. |

OTHER PUBLICATIONS

International Search Report and Written Opinion for PCT application PCT/US2015/029033, mailed Jul. 20, 2015.
Junkers Flugzeug-und Motorenwerke A.G., Junkers Diesel Flugmotoren Jumo 205C, D u. 207B, Dessau, Oct. 1942, pp. 22-24.

* cited by examiner

OPEN INTAKE AND EXHAUST CHAMBER CONSTRUCTIONS FOR AN AIR HANDLING SYSTEM OF AN OPPOSED-PISTON ENGINE

RELATED APPLICATIONS

This application contains subject matter related to that of commonly-owned U.S. patent applications Ser. Nos. 13/782,802 and 14/039,856. This application further contains subject matter related to that of concurrently-filed, commonly-owned U.S. patent application Ser. No. 14/284,058, "Air Handling Constructions for Opposed-Piston Engines".

BACKGROUND

The field concerns an air handling system of an opposed-piston engine that delivers charge air to, and transports exhaust from, the cylinders of the engine. The cylinders are arranged inline in a cylinder block. The cylinder block includes an open intake chamber and an open exhaust chamber. All intake ports of the cylinders are positioned in the intake chamber and all exhaust ports of the cylinders positioned in the exhaust chamber.

A two-stroke cycle engine is an internal combustion engine that completes a cycle of operation with a single complete rotation of a crankshaft and two strokes of a piston connected to the crankshaft. The strokes are typically denoted as compression and power strokes. One example of a two-stroke cycle engine is an opposed-piston engine in which two pistons are disposed in the bore of a cylinder for reciprocating movement in opposing directions along the central axis of the cylinder. Each piston moves between a bottom center (BC) location where it is nearest one end of the cylinder and a top center (TC) location where it is furthest from the one end. The cylinder has ports formed in the cylinder sidewall near respective BC piston locations. Each of the opposed pistons controls one of the ports, opening the port as it moves to its BC location, and closing the port as it moves from BC toward its TC location. One of the ports serves to admit charge air into the bore, the other provides passage for the products of combustion out of the bore; these are respectively termed "intake" and "exhaust" ports (in some descriptions, intake ports are referred to as "air" ports or "scavange" ports). In a uniflow-scavenged opposed-piston engine, pressurized charge air enters a cylinder through its intake port as exhaust gas flows out of its exhaust port, thus gas flows through the cylinder in a single direction ("uniflow")—from intake port to exhaust port.

Charge air and exhaust products flow through the cylinder via an air handling system (also called a "gas exchange" system). Fuel is delivered by injection from a fuel delivery system. As the engine cycles, a control mechanization governs combustion by operating the air handling and fuel delivery systems in response to engine operating conditions. The air handling system may be equipped with an exhaust gas recirculation ("EGR") system to reduce undesirable compounds produced by combustion.

In an opposed-piston engine, the air handling system moves fresh air into and transports combustion gases (exhaust) out of the engine, which requires pumping work. The pumping work may be done by a gas-turbine driven pump, such as a compressor, and/or by a mechanically-driven pump, such as a supercharger. In some instances, the compressor unit of a turbocharger may feed the input of a downstream supercharger in a two-stage pumping configuration. The pumping arrangement (single stage, two-stage, or otherwise) drives the scavenging process, which is critical to ensuring effective combustion, increasing the engine's indicated thermal efficiency, and extending the lives of engine components such as pistons, rings, and cylinders. The pumping work also drives an exhaust gas recirculation system.

FIG. 1 illustrates a turbocharged, two-stroke cycle, opposed-piston engine 10 with uniflow scavenging. The engine 10 has at least one ported cylinder 50. For example, the engine may have one ported cylinder, two ported cylinders, or three or more ported cylinders. Each ported cylinder 50 has a bore 52 and longitudinally-spaced intake and exhaust ports 54 and 56 formed or machined near respective ends of a cylinder wall. Each of the intake and exhaust ports includes one or more circumferential arrays of openings or perforations. In some descriptions, each opening is referred to as a "port"; however, the construction of one or more circumferential arrays of such "ports" is no different than the port constructions shown in FIG. 1. Pistons 60 and 62 are slidably disposed in the bore 52 with their end surfaces 61 and 63 in opposition. The piston 60 controls the intake port 54, and the piston 62 controls the exhaust port 56. In the example shown, the engine 10 further includes at least one crankshaft; preferably, the engine includes two crankshafts 71 and 72. The intake pistons 60 of the engine are coupled to the crankshaft 71, and the exhaust pistons 62 to the crankshaft 72.

As the pistons 60 and 62 near their TC locations, a combustion chamber is defined in the bore 52 between the end surfaces 61 and 63 of the pistons. Combustion timing is frequently referenced to the point in the compression cycle where minimum combustion chamber volume occurs because the pistons end surfaces are nearest each other; this point is referred to as "minimum volume." Fuel is injected directly into cylinder space located between the end surfaces 61 and 63. In some instances injection occurs at or near minimum volume; in other instances, injection may occur before minimum volume. Fuel is injected through one or more fuel injector nozzles positioned in respective openings through the sidewall of the cylinder 50. Two such nozzles 70 are shown. The fuel mixes with charge air admitted into the bore 52 through the intake port 54. As the air-fuel mixture is compressed between the end surfaces 61 and 63, the compressed air reaches a temperature and a pressure that cause the fuel to ignite. Combustion follows.

With further reference to FIG. 1, the engine 10 includes an air handling system 80 that manages the transport of charge air to, and exhaust gas from, the engine 10. A representative air handling system construction includes a charge air subsystem and an exhaust subsystem. In the air handling system 80, a charge air source receives intake air and processes it into pressurized air (hereinafter "charge air"). The charge air subsystem transports the charge air to the intake ports of the engine. The exhaust subsystem transports exhaust products from exhaust ports of the engine for delivery to other exhaust components.

The air handling system 80 may include a turbocharger 120 with a turbine 121 and a compressor 122 that rotate on a common shaft 123. The turbine 121 is in fluid communication with the exhaust subsystem and the compressor 122 is in fluid communication with the charge air subsystem. The turbocharger 120 extracts energy from exhaust gas that exits the exhaust ports 56 and flows into an exhaust channel 124 directly from the exhaust ports 56, or from an exhaust manifold assembly 125 that collects exhaust gasses output through the exhaust ports 56. In this regard, the turbine 121 is rotated by exhaust gas passing through it to an exhaust outlet channel 128. This rotates the compressor 122, causing it to generate charge air by compressing fresh air. The charge air subsystem may include a supercharger 110 and an intake manifold 130. The charge air subsystem may further include at least one charge air cooler (hereinafter, "cooler") to receive and cool the charge air before delivery to the intake port or ports of the engine. The charge air output by the compressor 122 flows through a charge air channel 126 to a cooler 127, whence it is pumped by the supercharger 110 to the intake ports. Charge air compressed by the supercharger 110 is output to an intake manifold 130. The intake ports 54 receive charge air pumped by the supercharger 110, through the intake manifold 130. A second cooler 129 may be provided between the output of the supercharger 110 and the input to the intake manifold 130.

In some aspects, the air handling system 80 may be constructed to reduce undesirable emissions produced by combustion by recirculating a portion of the exhaust gas produced by combustion through the ported cylinders of the engine. The recirculated exhaust gas is mixed with charge air to lower peak combustion temperatures, which reduces production of the undesirable emissions. This process is referred to as exhaust gas recirculation ("EGR"). The EGR construction shown obtains a portion of the exhaust gasses flowing from the port 56 during scavenging and transports them via an EGR channel 131 external to the cylinders into the incoming stream of inlet air in the charge air subsystem. The recirculated exhaust gas flows through the EGR channel 131 under the control of a valve 138 (referred to as the "EGR valve").

FIG. 2 shows the air handling system 80 of FIG. 1 in schematic detail. In this regard, the charge air subsystem provides intake air to the compressor 122. As the compressor 122 rotates, compressed air flows from the compressor's outlet, through the Charge air channel 126, and into the supercharger 110. Charge air pumped by the supercharger 110 flows through the cooler 129 into the intake manifold 130. Pressurized charge air is delivered from the intake manifold 130 to the intake ports of the cylinders 50, which are supported in a cylinder block 160. In some aspects, the engine may include a recirculation channel 112 that couples the output of the supercharger 110 to its input. Provision of a valve 139 in the recirculation channel 112 allows the charge air flow to the cylinders to be varied by modulation of charge air pressure downstream of the supercharger outlet.

Exhaust gasses from the exhaust ports of the cylinders 50 flow from the exhaust manifold 125 into the turbine 121, and from the turbine into the exhaust outlet channel 128. In some instances, one or more after-treatment devices (AT) 162 are provided in the exhaust outlet channel 128. Exhaust is recirculated through the EGR channel 131, under control of the EGR valve 138. The EGR channel 131 is in fluid communication with the charge air subsystem via an EGR mixer 163.

Opposed-piston engines have included various constructions designed to transport engine gasses (charge air, exhaust) into and out of the cylinders. For example, U.S. Pat. No. 1,517,634 describes an early opposed-piston aircraft engine that made use of a multi-pipe exhaust manifold having a pipe in communication with the exhaust area of each cylinder that merged with the pipes of the other cylinders into one exhaust pipe. The manifold was mounted to one side of the engine.

Later, in the 1930s, the Jumo 205 family of opposed-piston aircraft engines defined a basic air handling architecture for dual-crankshaft opposed-piston engines. The Jumo engine included an inline cylinder block with six cylinders. The construction of the cylinder block included individual compartments for exhaust and intake ports. Manifolds and conduits constructed to serve the individualized ports were attached to or formed on the cylinder block. Thus, the engine was equipped with multi-pipe exhaust manifolds that bolted to opposite sides of the engine so as to place a respective pair of opposing pipes in communication with the annular exhaust area of each cylinder. The output pipe of each exhaust manifold was connected to a respective one of two entries to a turbine. The engine was also equipped with intake conduits located on opposing sides of the engine that channeled charge air to the individual intake areas of the cylinders. A two-stage pressure charging system provided pressurized charge air for the intake conduits.

The prior art exhaust manifolds extracted a penalty in increased engine size and weight. Each individual pipe required structural support in order to closely couple the pipe opening with the annular exhaust space of a cylinder. Typically, the support was in the form of a flange at the end of each pipe with an area sufficient to receive threaded fasteners for sealably fastening the flange to a corresponding area on a side of the cylinder block. The flanges of each manifold were arranged row-wise in order to match the inline arrangement of the cylinders. The flange width restricted cylinder-to-cylinder spacing, which required the engine to be comparatively heavy and large.

The intake construction of the Jumo 205 engines included a manifold formed inside the cylinder block by subdividing space into individual compartments for the inlet areas of the cylinders. Each compartment opened through opposing sides of the cylinder block to receive charge air from the air conduits. Such a manifold structure can result in charge air pressure differentials between inlet ports, which can cause variations in combustion and scavenging as engine operating conditions change.

SUMMARY

It is desirable to minimize the size, weight, and cost of an opposed-piston engine with multiple cylinders arranged in an inline configuration. This is achieved by provision of a single, open exhaust chamber inside the cylinder block that contains all of the cylinder exhaust ports, which eliminates the need for a flanged, multi-pipe manifold construction. Instead of collecting and transporting exhaust gas discharged from individual exhaust ports with dedicated pairs of pipes, exhaust gas discharged by all of the exhaust ports is collected in a single exhaust chamber within the cylinder block and transported therefrom by a single pipe. The discharged exhaust gas exits the chamber through at least one exhaust outlet that opens through the cylinder block. Advantageously, only a single pipe is required to transport exhaust gas from the exhaust outlet to the exhaust subsystem, thereby eliminating the flange-to-flange spacing between separate pipes of the prior art exhaust manifolds. As a result, the weight, complexity, and expense of the multi-pipe exhaust manifolds are eliminated, inter-cylinder spacing can be reduced, and the engine can be made more compact.

Improvements in combustion and scavenging in an opposed-piston engine with multiple cylinders arranged in an inline configuration are obtained with provision of a single, open intake chamber inside the cylinder block that contains all of the cylinder intake port. Instead of transporting charge air to individual intake compartments, the single, open intake chamber within the cylinder block provides charge air to all of the intake ports at substantially uniform pressure, thereby ensuring substantially uniform combustion and scavenging. The engine is thereby made more efficient, cleaner-running, and easier to control over the range of operating conditions that it was designed for.

SPECIFICATION

This specification concerns a two-stroke cycle, dual crankshaft, opposed-piston engine having a cylinder block with a plurality of cylinders aligned in one row such that a single plane contains the longitudinal axes of all the engine's cylinders. The row-wise alignment of the cylinders is referred to as an "inline" configuration in keeping with standard nomenclature of the engine arts. Furthermore, the inline arrangement can be "straight", wherein the plane containing the longitudinal axes is essentially vertical, or "slant", wherein the plane containing the longitudinal axes is slanted. Thus, while the following description is limited to an inline configuration, it is applicable to straight and slant variations. It is also possible to position the engine in such a manner as to dispose the plane containing the longitudinal axes essentially horizontally, in which case the inline arrangement would be "horizontal".

Figure 1:
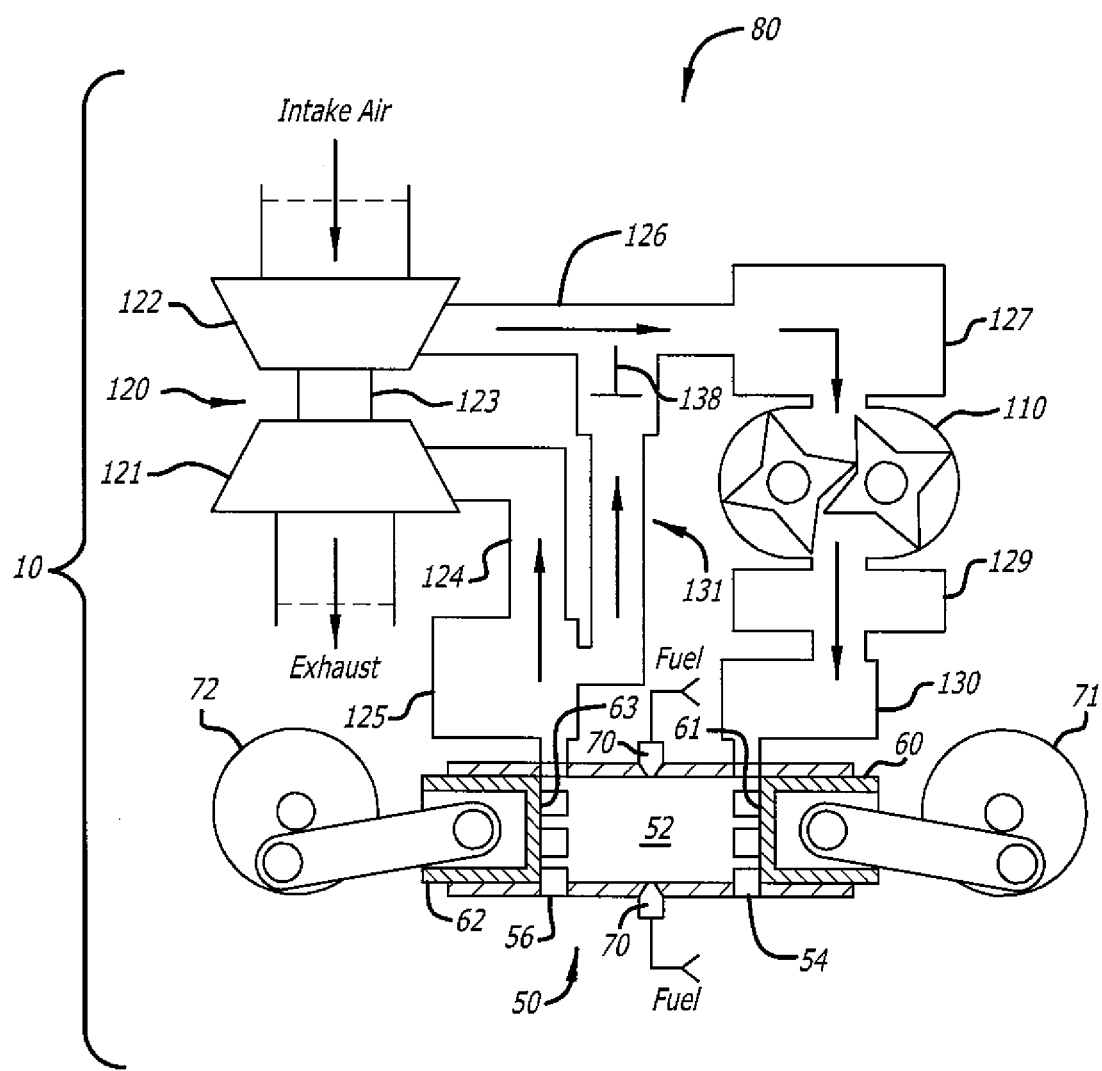
FIG. 1 is a schematic diagram of a prior art two-stroke cycle, opposed-piston engine with uniflow scavenging, and is appropriately labeled "Prior Art".
Figure 2:
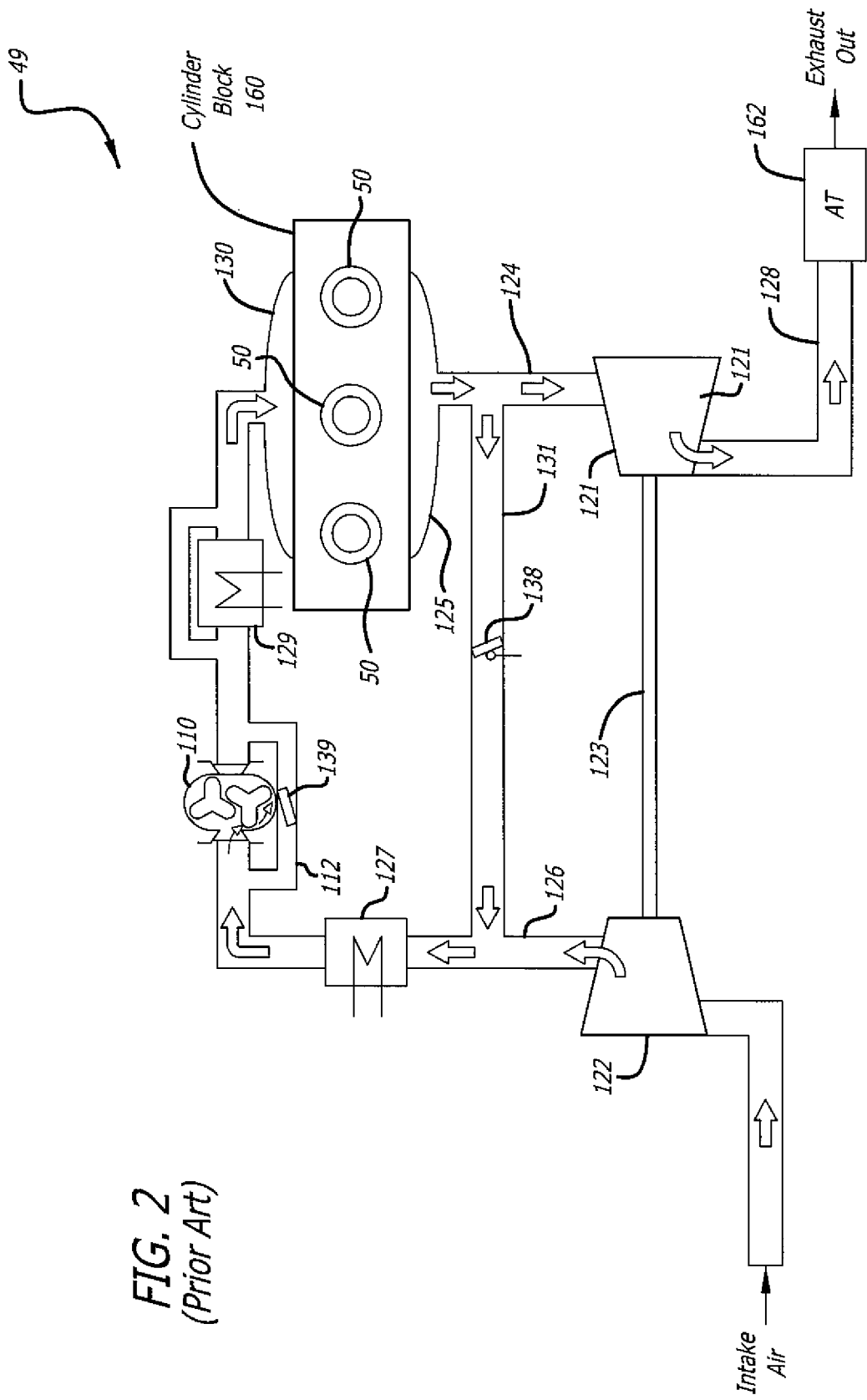
FIG. 2 is a schematic diagram showing details of a prior art air handling system for the opposed-piston engine of FIG. 1, and is appropriately labeled "Prior Art".
Figure 3A:
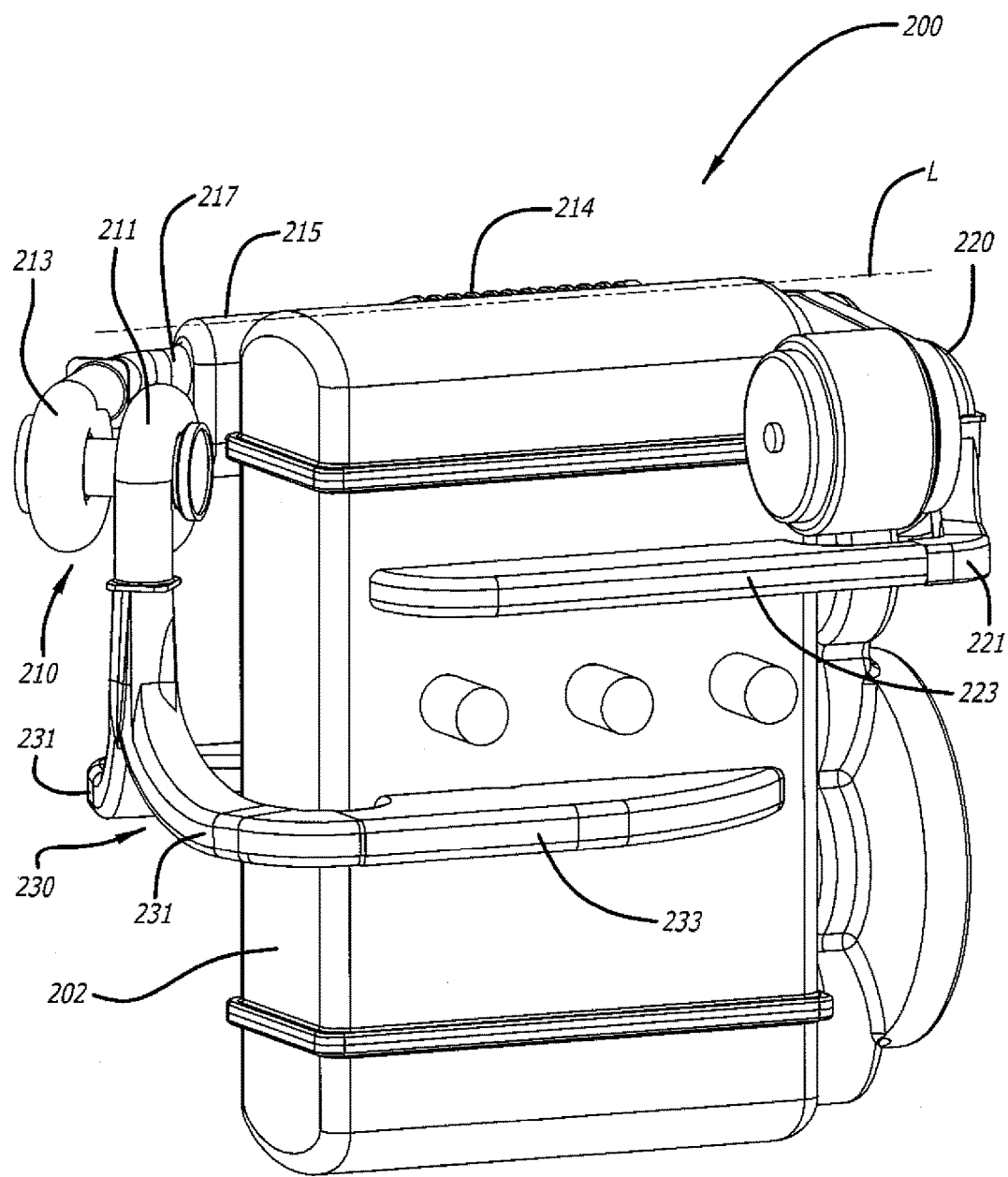
FIG. 3A is a perspective view along one side of a two-stroke cycle, opposed-piston engine configured for fitment in a vehicle.
Figure 3B:
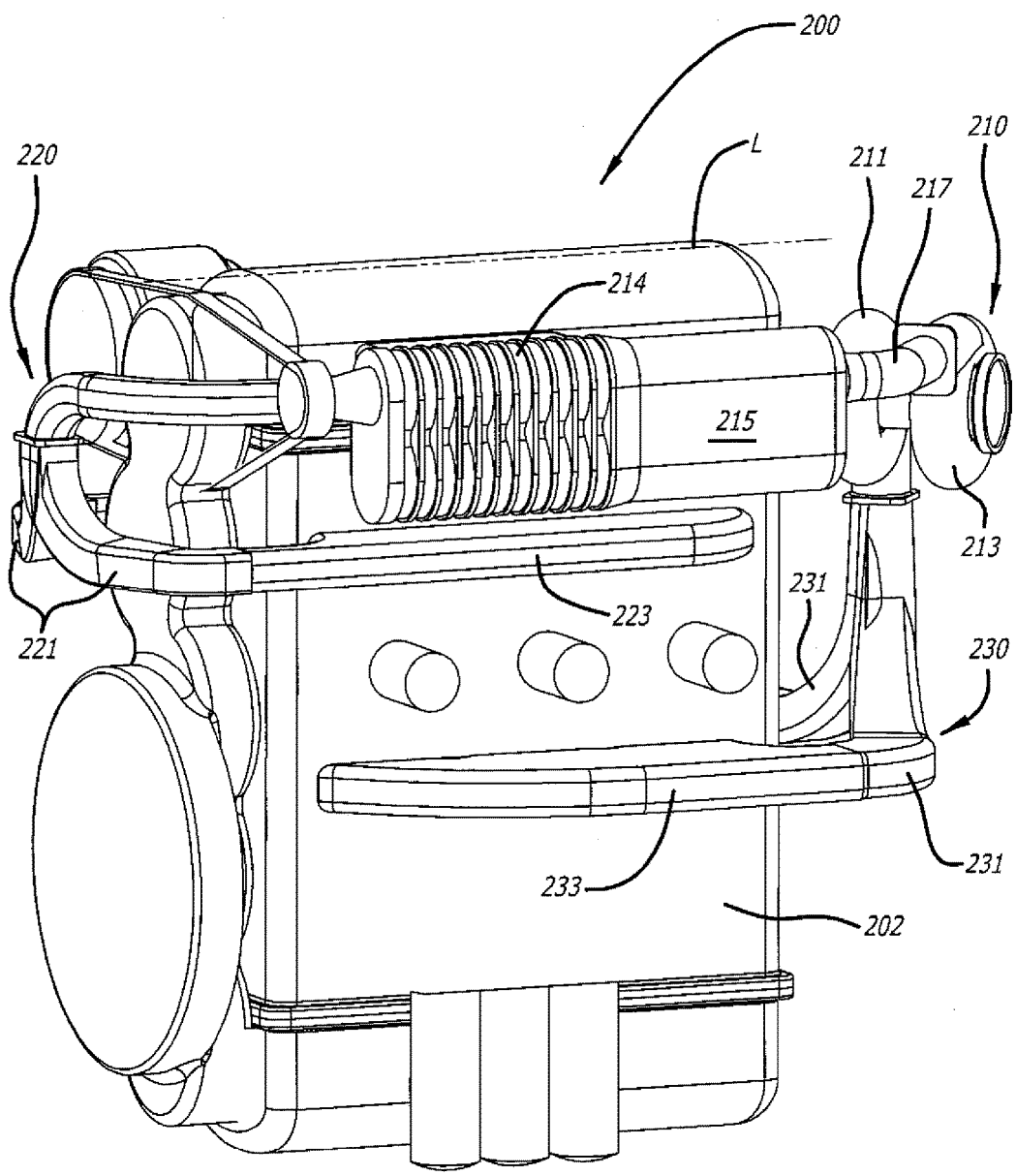
FIG. 3B is a perspective view of along the opposite side of the engine of FIG. 3A.

FIGS. 3A and 3B show a two-stroke-cycle, opposed-piston engine 200 having a cylinder block 202 comprising the cylinders (unseen in these figures) of the engine, which are arranged in a straight inline configuration oriented in a longitudinal direction L of the engine 200. The engine is configured to be compact so as to occupy minimal space in applications such as vehicles, locomotives, maritime vessels, stationary power sources, and so on. The engine 200 is fitted with an air handling system including a turbocharger 210, a supercharger, 214, intake and exhaust chambers (unseen in these figures) formed or machined in the cylinder block 202, and various pipes, manifolds, and conduits. With the exception of the intake and exhaust chambers, these elements may be supported on the cylinder block using conventional means. The intake and exhaust chambers are formed as elongate, open galleries or chests inside the cylinder block. The turbocharger 210 comprises an exhaust-driven turbine 211 and a compressor 213. Preferably, but not necessarily, the supercharger 214 is mechanically driven, for example by a crankshaft. The output of the compressor 213 is in fluid communication with the intake of the supercharger 214 via the conduit 217. In some aspects, a charge air cooler 215 may be placed in the airflow path between the compressor 213 and the supercharger 214. Although not necessary to this specification, the output of the supercharger 214 may be recirculated to its input through a recirculation channel (not shown in these figures). The output of the supercharger 214 is in fluid communication with the intake chamber via a manifold 220, each branch 221 of which is coupled to a respective elongate opening of the intake chamber by way of a cover 223. The intake of the turbine 211 is in fluid communication with the exhaust chamber via a manifold 230, each branch 231 of which is coupled to a respective elongate opening of the exhaust chamber by way of a cover 233. Although not shown in these figures, the engine 200 may be equipped with a valve-controlled conduit between the exhaust chamber and the supercharger 214 for EGR.

Figure 4A:
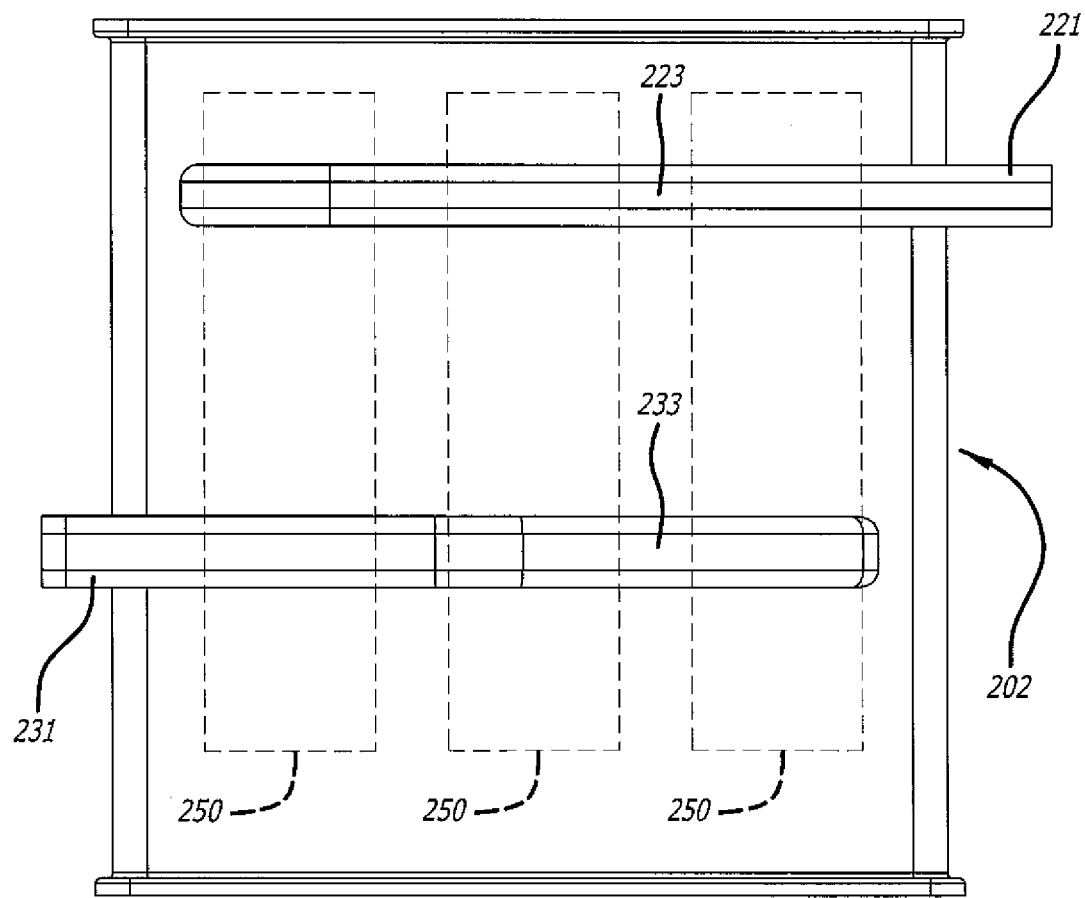
FIG. 4A is an elevation view of a cylinder block of the engine of FIG. 3A, showing the same side as is seen in FIG. 3A.
Figure 4B:
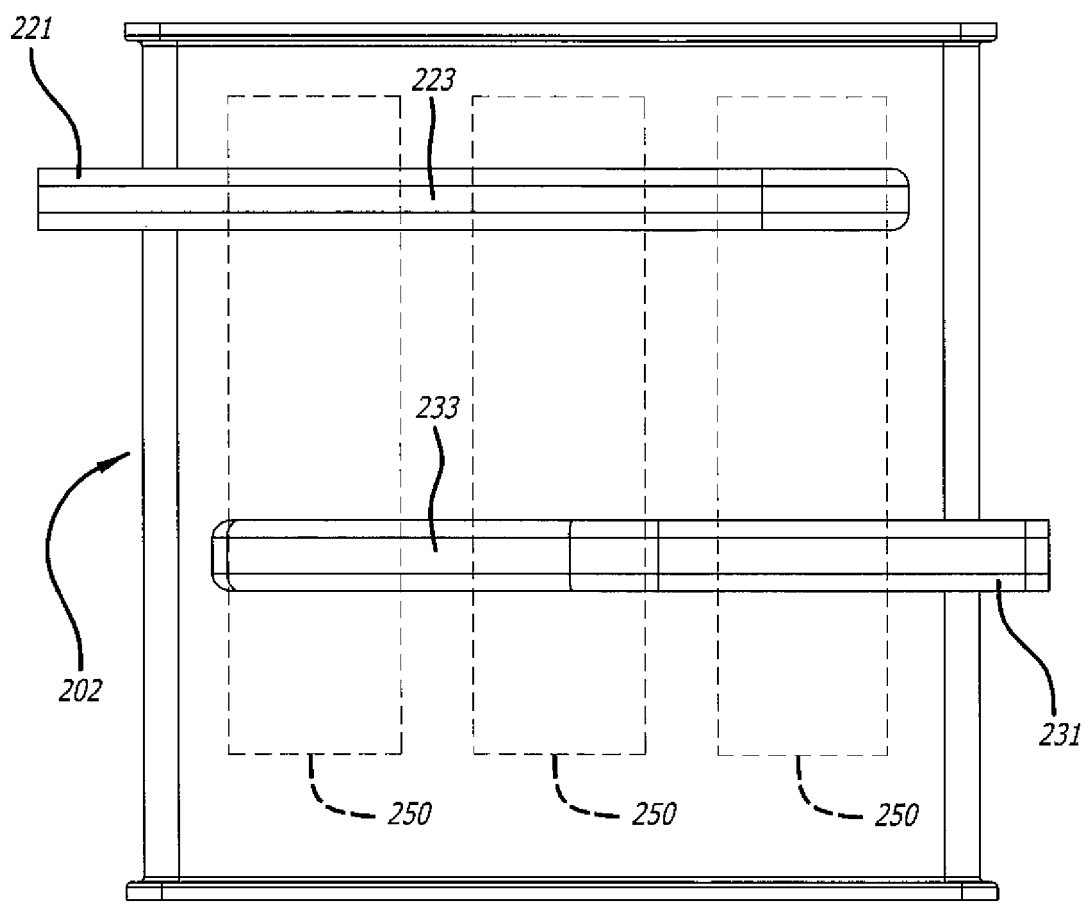
FIG. 4B is an elevation view of a cylinder block of the engine of FIG. 3A, showing the same side as is seen in FIG. 3B.
Figure 4C:
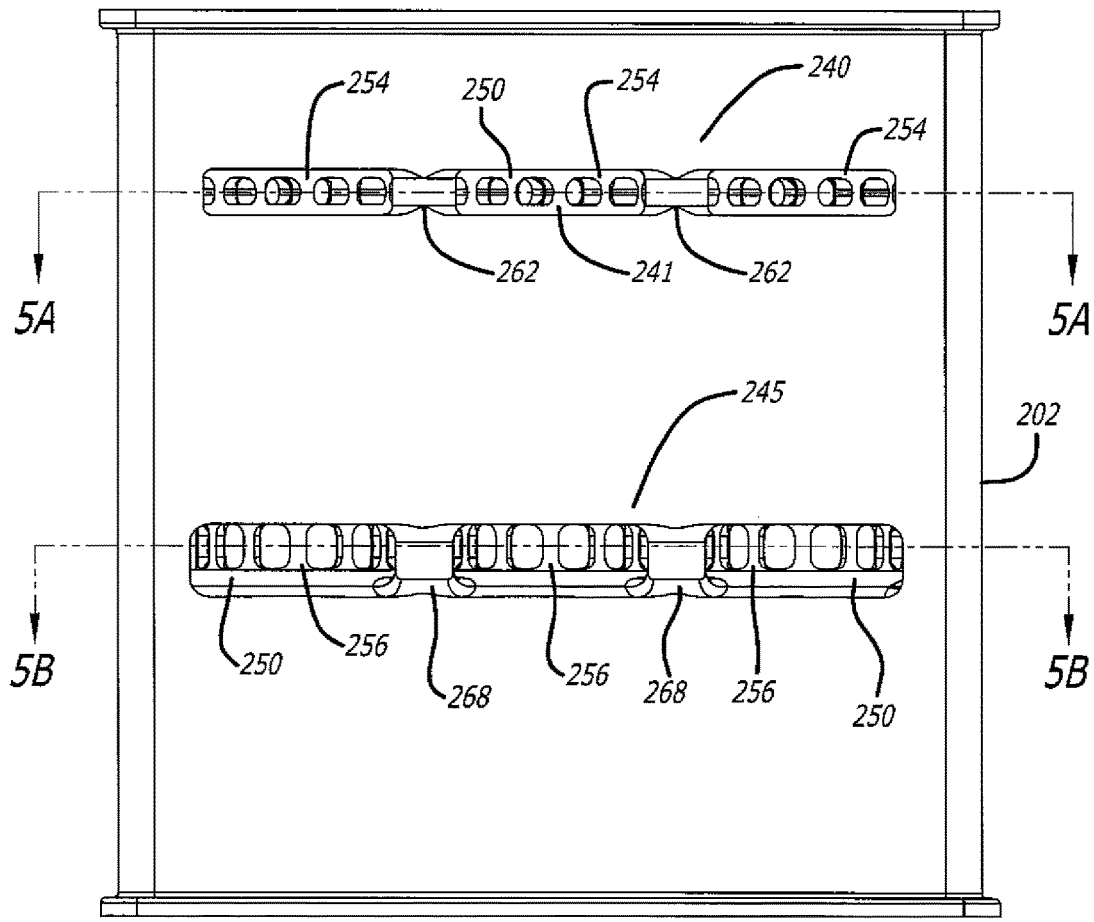
FIG. 4C is side view of the cylinder block of FIG. 4A with elements removed to show an intake chamber and an exhaust chamber.

FIGS. 4A and 4B show opposite, outward-facing sides of the cylinder block 202, in elevation, with a number of components removed to show branches 221 of the intake manifold with respect to air inlets of the intake chamber and branches 231 of the exhaust manifold with respect to exhaust outlets of the exhaust chamber. FIG. 4C shows one side of the cylinder block 202 with elements removed to make visible an intake chamber 240 and an exhaust chamber 245. Both the intake chamber 240 and the exhaust chamber 245 open through the opposite sides of the cylinder block 202. As is shown in these figures, the cylinder block 202 includes multiple cylinders. For illustration, three cylinders 250 are shown. In this specification, a "cylinder" is constituted of a liner (sometimes called a "sleeve") retained in a cylinder tunnel formed in the cylinder block 202. Each liner has an annular intake portion including a cylinder intake port 254 longitudinally separated from an annular exhaust portion including a cylinder exhaust port 256. Two counter-moving pistons (not shown) are disposed in the bore of each liner. The cylinders 250 are arranged inline in the cylinder block 202, with the intake ports 254 and exhaust ports 256 aligned at separate levels of the cylinder block 202. Preferably, the exhaust ports 256 are disposed at a level below the intake ports 254.

Figure 5A:
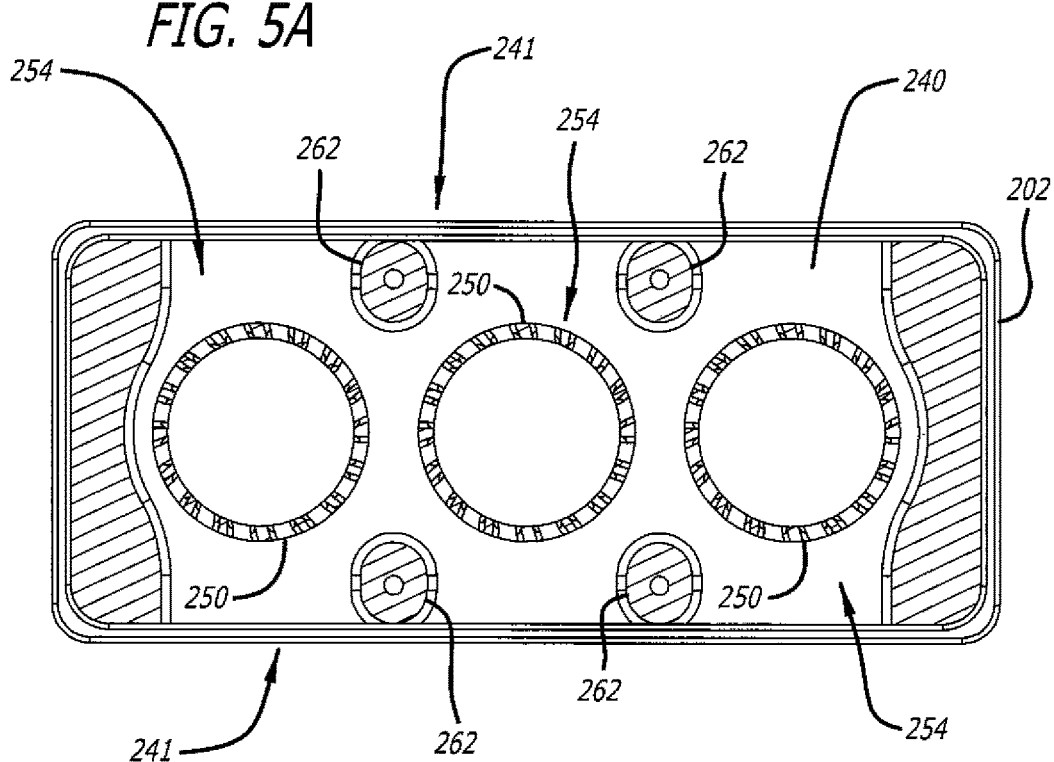
FIG. 5A is a section, in plan, taken along lines A-A of FIG. 4C to show details of an intake chamber.

With reference to FIGS. 4C and 5A, the structure of the intake chamber 240 is that of an elongate open chest or gallery inside the cylinder block 202 with a volume that contains all of the cylinder intake ports 254. In other words, each and every one of the intake ports of the engine is positioned in, and receives charge air from, a common volume in the intake chamber 240 that is shared by all of the intake ports. Preferably, the intake chamber 240 is undivided, at least in the sense that it is not partitioned into individual chambers or sub-chambers, each containing the annular intake area of only a single cylinder. As per FIG. 5A, the intake chamber 240 includes a first elongate air inlet 241 that opens through a first side of the cylinder block 202 and a second elongate air inlet 241 that opens through a second side of the cylinder block 202 that is opposite the first side. Preferably, the elongate air inlets 241 are mutually aligned. Support posts 262 in the intake chamber 240 provide structural support between the floor and ceiling of the intake chamber 240. Preferably, the posts 262 are positioned away from the cylinders 250, abutting, or inwardly of, the air inlets 241. Shaped chests 223 (FIGS. 4A and 4B) external to the cylinder block 202 that cover the air inlets may be formed on or attached to the opposing sides of the block. At least one of the chests 223 is in fluid communication with a pipe or conduit for transporting charge air from the charge air subsystem of the engine into the intake chamber 240.

Figure 5B:
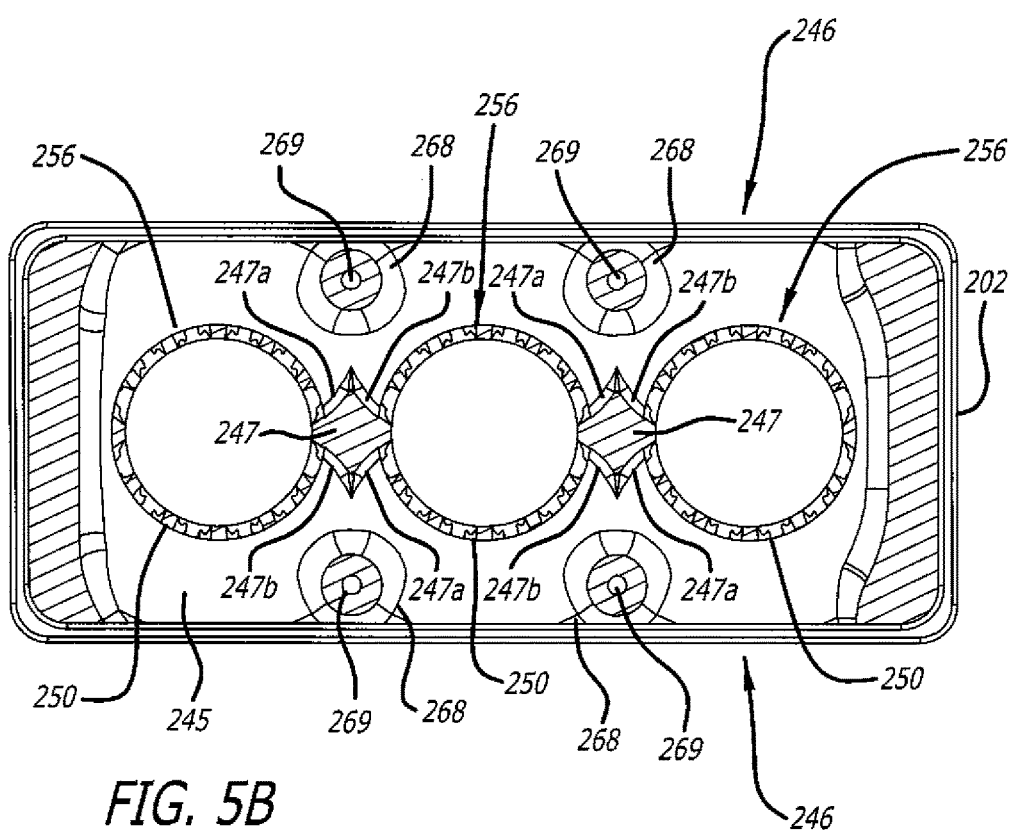
FIG. 5B is a section, in plan, taken along lines B-B of FIG. 4C to show details of an exhaust chamber.

With respect to FIGS. 4C and 5B, the structure of the exhaust chamber 245 is that of an elongate open chest inside the cylinder block with a volume that contains all of the cylinder exhaust ports 256. In other words, each and every one of the exhaust ports of the engine is positioned in, and discharges exhaust gasses into, a common volume in the exhaust chamber 245 that is shared by all of the exhaust ports. Preferably, the exhaust chamber 245 is undivided, at least in the sense that it is not partitioned into individual chambers or sub-chambers, each containing the annular exhaust area of only a single cylinder. The exhaust chamber has an elongate exhaust outlet 246 through a first side of the cylinder block 202 and an elongate exhaust outlet 246 through a second side of the cylinder block 202 that is opposite the first side. Support posts 268 in the exhaust chamber 245 provide structural support between the floor and ceiling of the exhaust chamber 245. Preferably, the posts 268 are positioned away from the cylinders, abutting the exhaust chamber openings 246. In view of the mechanical loads borne by the cylinder block 202 during operation of the engine, it may be desirable to have the posts 262 of the intake chamber in alignment with the posts 268 of the exhaust chamber. In some aspects it may be desirable to provide axial coolant passageways 269 in the posts 268 in order to mitigate detrimental temperature effects in the structure of the exhaust chamber 245 during engine operation. Shaped chests 233 (FIGS. 4A and 4B) external to the cylinder block 202 that cover the exhaust outlets may be formed on or attached to the opposing sides of the block. At least one of the chests 233 is in fluid communication with a pipe or conduit for transporting exhaust gasses from the exhaust chamber into the exhaust subsystem of the engine.

While the open chest structure of the exhaust chamber 245 may permit close inter-cylinder spacing, the reduced distance between adjacent cylinder sleeves can increase the thermal impact of exhaust gas being discharged from one cylinder on the pistons and sleeves of adjacent cylinders, especially in the narrow gaps between the exhaust portions of the sleeves. Thus, in some instances, it may be desirable to reduce the thermal impact of exhaust gasses being discharged from a cylinder on the adjacent cylinder skirts. One way to reduce this thermal impact is to provide shaped exhaust deflectors 247 in the exhaust chamber 245, between adjacent cylinder exhaust portions. Each deflector may be formed as a post that extends between the floor and ceiling of the exhaust chamber 245. The exhaust deflectors 247 are positioned between adjacent cylinders 250, in the vicinity of the cylinders' exhaust areas. The shapes of the exhaust deflectors 247 include pairs of surfaces 247a and 247b that meet at an angle to form an edge facing one of the exhaust chamber openings. For example, the cross-sectional shape of an exhaust deflector may be rhombus-like. The surfaces 247a and 247b are angled to deflect exhaust gas being discharged from one exhaust port away from the adjacent cylinder. Although FIG. 5B suggests that the exhaust deflectors 247 are in contact with adjacent cylinders, this is not a necessary limitation. In some aspects, the deflectors may be of a size so as not to contact the cylinders, thereby permitting gas flow between cylinders and the deflectors. Alternatively (or in addition), the exhaust port openings may vary in size and/or spacing around the annular exhaust portions of the cylinder liners so as to provide relatively greater exhaust flows in the directions of the exhaust chamber openings than in the directions of nearby structures such as adjacent liners and/or exhaust chamber walls.

According to this specification, the air handling system of an opposed-piston engine such as that shown in FIGS. 3A and 3B includes an intake/exhaust subsystem equipped with open intake and exhaust chamber constructions such as those shown in FIGS. 5A and 5B.

Figure 6A:
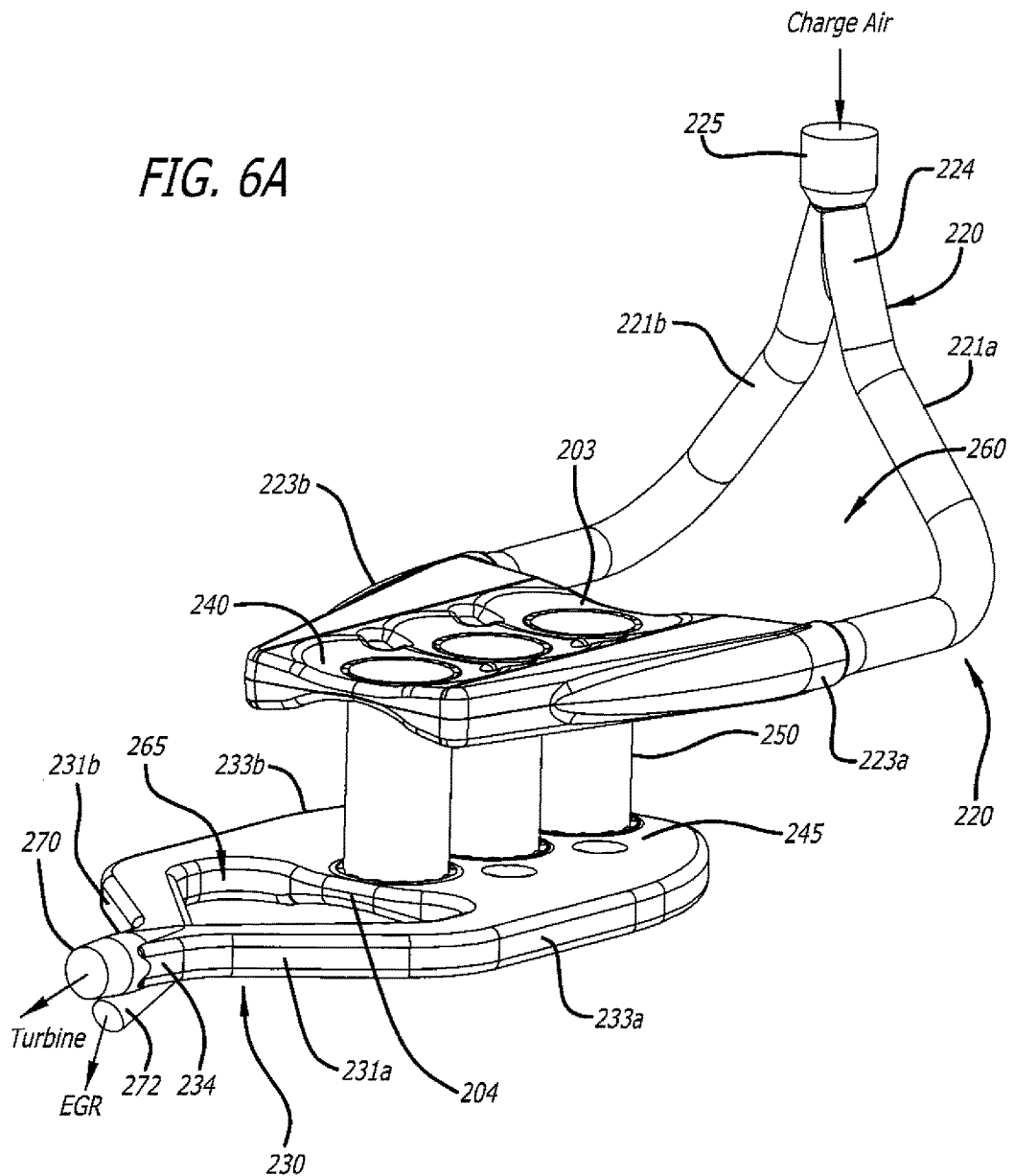
FIG. 6A is an illustration of an intake/exhaust subsystem embodiment for an air handling system of an opposed-piston engine.

A first embodiment of an intake/exhaust subsystem is shown in FIGS. 3A, 5A, and 6A, in which the intake manifold 220 includes a first portion including the branch 221a and the cover 223a disposed along a first side of the cylinder block 202 in fluid communication with a first air inlet 241 of the intake chamber 240 and a second portion including the branch 221b and the cover 223b disposed along the second side of the cylinder block 202 in fluid communication with the second air inlet 241. The first and second manifold portions extend past a first end 203 of the cylinder block 202 and merge into a pipe 224 beyond the first end 203. An opening 260 bordered by 221a, 221b, and 203 is thereby defined. The opening 260 provides room to accommodate various engine parts, as may be necessary for an engine layout. The pipe 224 includes an inlet 225 through which the intake chamber is placed in fluid communication with a supercharger outlet. With reference to FIGS. 3A, 5B, and 6A, the exhaust manifold 230 includes a first portion including the branch 231a and the cover 233a disposed along a first side of the cylinder block 202 in fluid communication with a first exhaust outlet 246 and a second portion including the branch 231b and the cover 233b disposed along the second side of the cylinder block 202 in fluid communication with the second exhaust outlet 246. The first and second manifold portions extend past a second end 204 of the cylinder block 202 and merge into a pipe 234 beyond the second end 204. An opening 265 bordered by 231a, 231b, and 204 is thereby defined. The opening 265 provides room to accommodate various engine parts, as may be necessary for an engine layout. The pipe 234 includes an outlet 270 through which the exhaust chamber is placed in fluid communication with a turbine intake. The pipe 234 may additionally include an outlet 272 to feed an EGR channel.

Figure 6B:
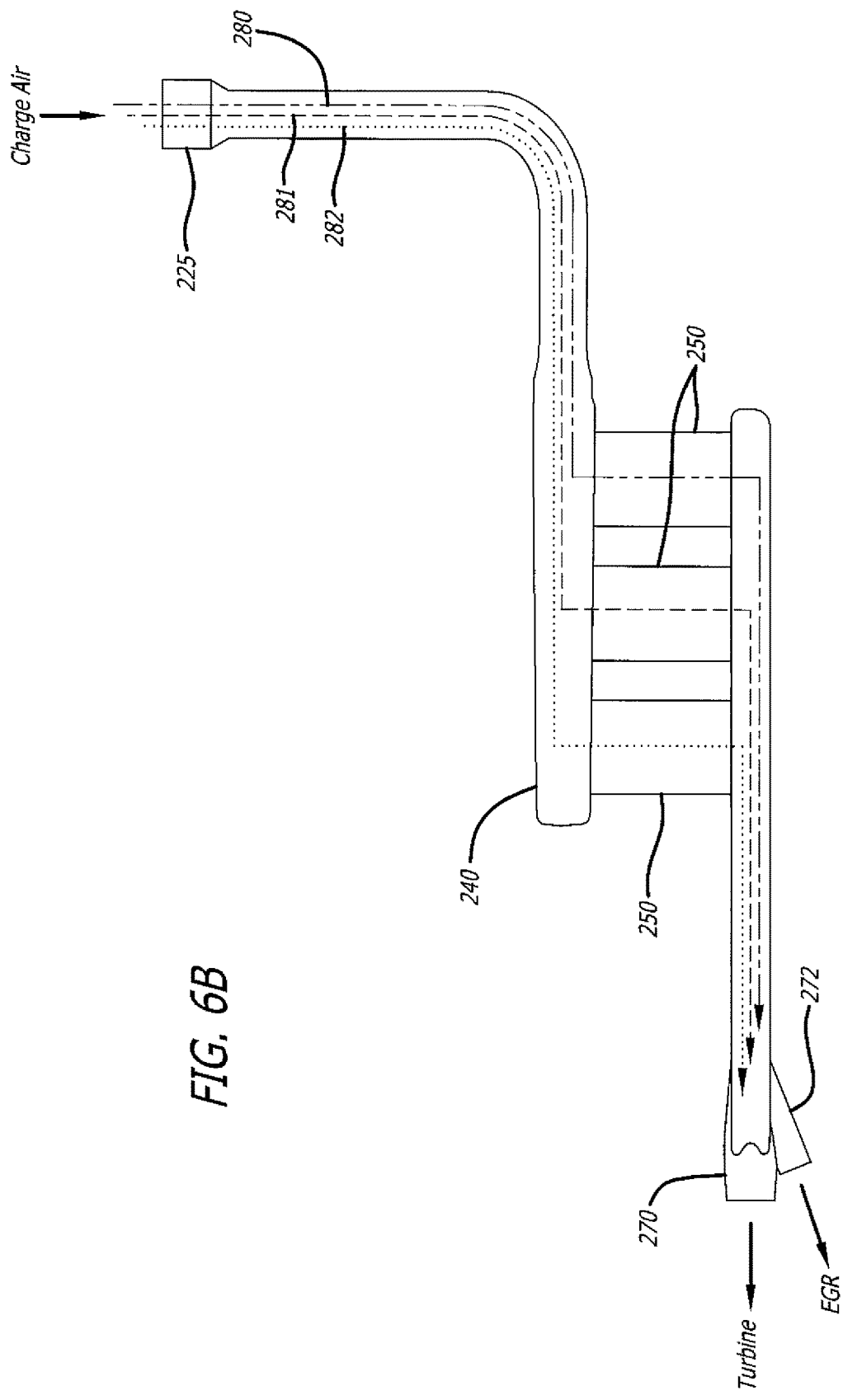
FIG. 6B is a schematic illustration of gas flow through the intake/exhaust subsystem of FIG. 6A.

As per FIGS. 6A and 6B, the first embodiment intake/ exhaust subsystem provides balanced mass flows into and out of the cylinders 250 over a broad range of engine operating conditions due to several factors. First, charge air enters the intake portion of the construction from one end 203 of the engine and exhaust is discharged from the exhaust portion at the opposite end 204. In addition the gas flow paths 280, 281, 282 through the cylinders have the same length and therefore experience generally equal airflow resistance.

Figure 7:
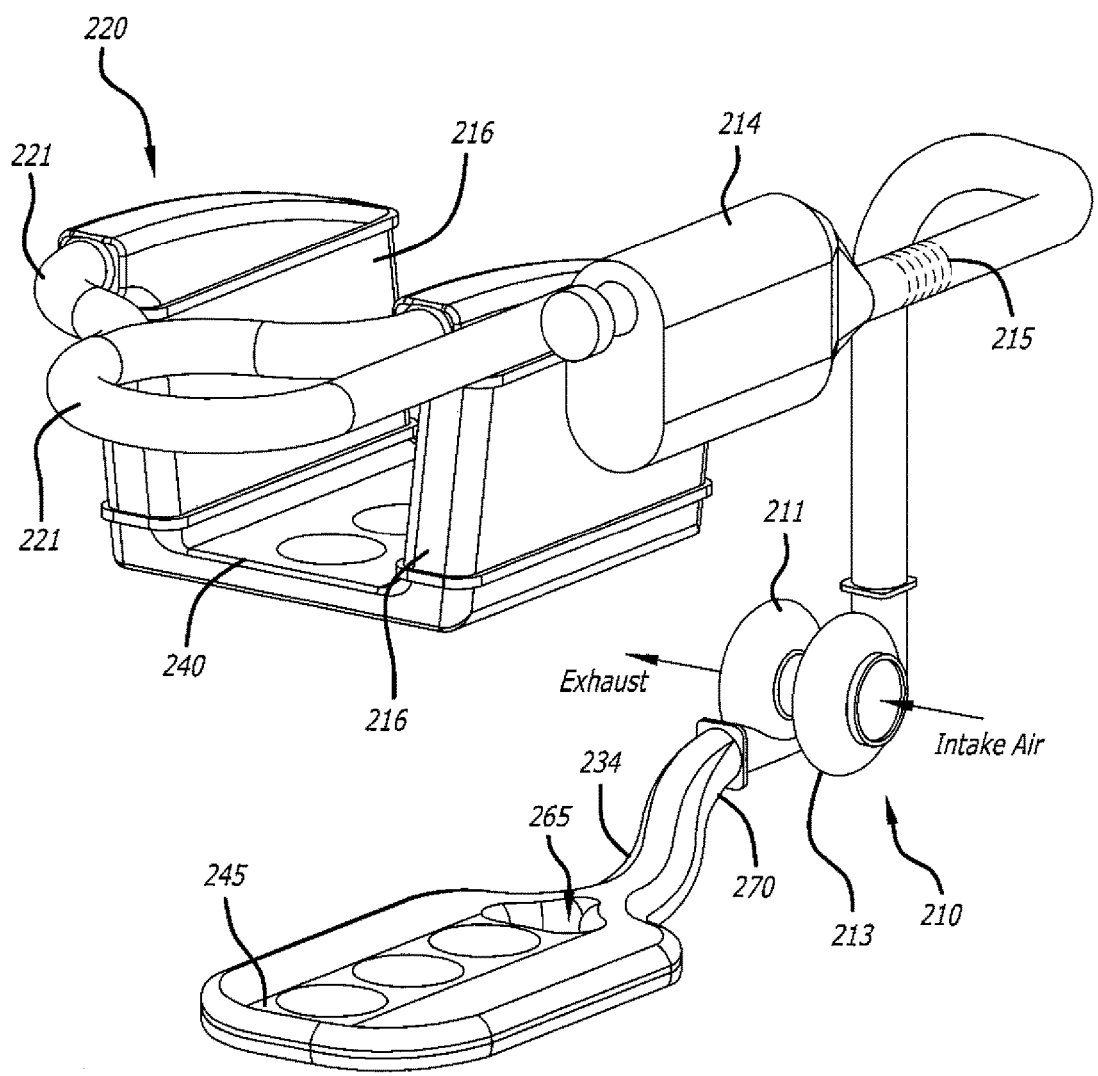
FIG. 7 is a schematic illustration of a second intake/exhaust subsystem embodiment that includes open intake and exhaust chambers according to FIGS. 5A and 5B.

A second embodiment intake/exhaust subsystem is shown in FIG. 7, where charge air coolers 216 are coupled between the branches 221 of the intake manifold 220 and the opposing air inlets 241 (FIG. 5A). In addition, another charge air cooler, such as the charge air cooler 215 seen in FIGS. 3A and 3B, may be placed in the location 215 between the output of the compressor 213 and the intake of the supercharger 214.

Figure 8:
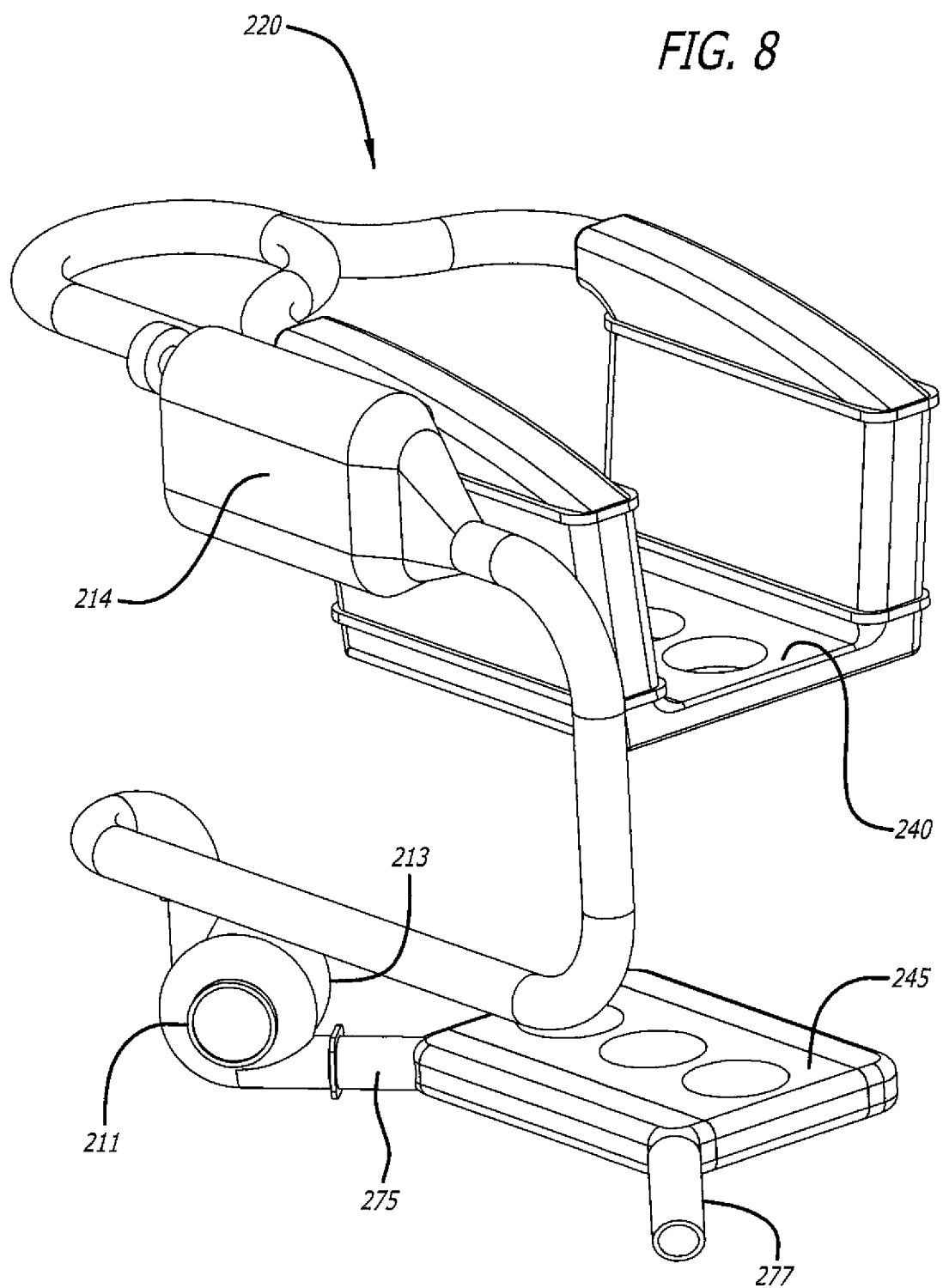
FIG. 8 is a schematic illustration of a third intake/exhaust subsystem embodiment that includes open intake and exhaust chambers according to FIGS. 5A and 5B.
Figure 9:
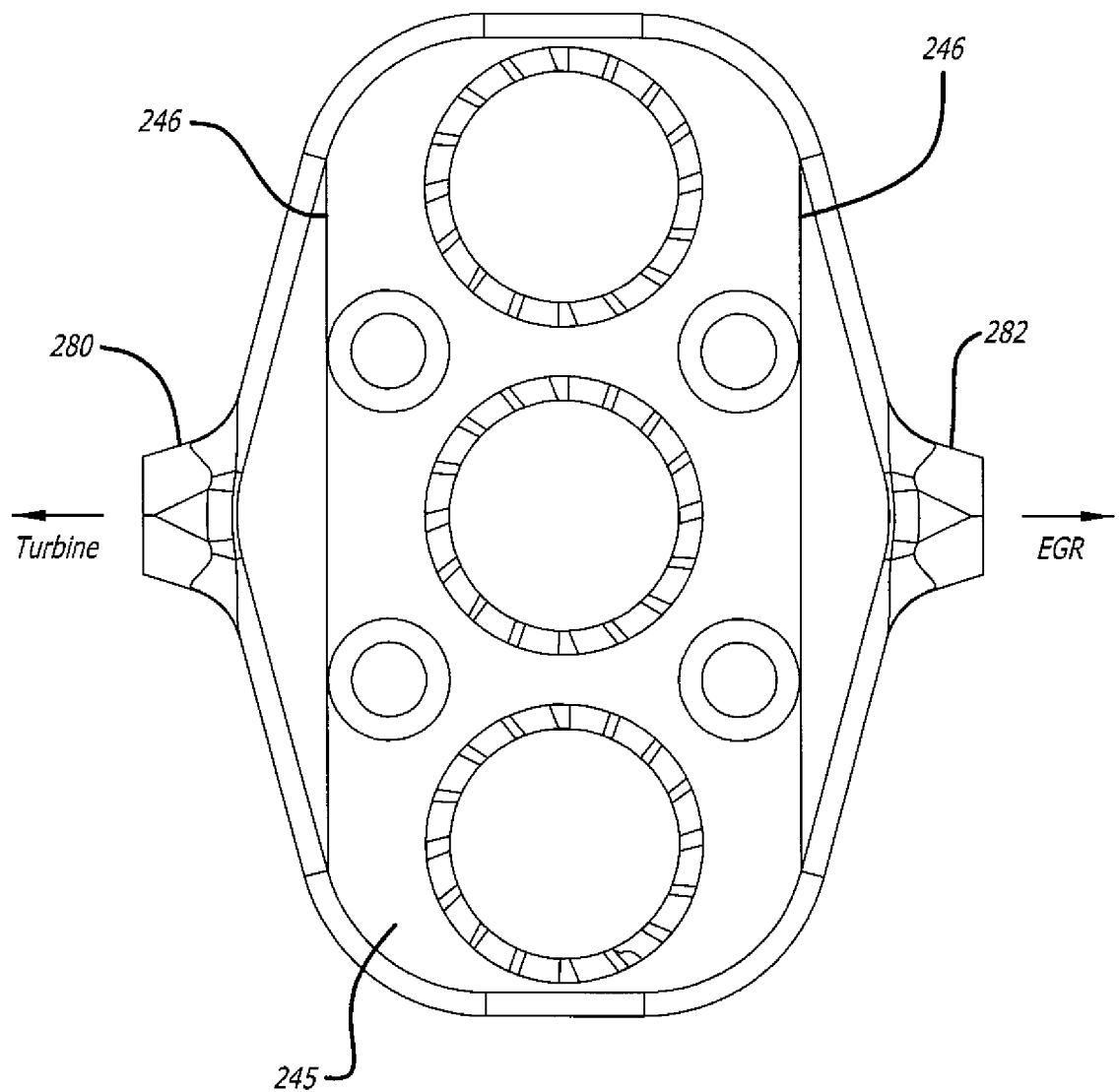
FIG. 9 is a partially schematic illustration of an alternate manifold arrangement for the exhaust chamber of FIG. 5B.

A third embodiment intake/exhaust subsystem, shown in FIG. 8, includes no manifold for the exhaust chamber 245. Instead, one or more exhaust outlets are provided from one exhaust opening 246 (FIG. 5B) on one side of the exhaust chamber 245. One exhaust outlet 275 is provided to drive the turbine 211. If the engine is equipped with EGR, a second exhaust outlet 277, separate from the first may be provided to drive an EGR loop. Alternatively, as shown in FIG. 9, the exhaust chamber 245 may be constructed with an exhaust output 280 to drive a turbine through one exhaust opening 246 and a second exhaust output 282 to drive an EGR loop through the opposing exhaust opening 246.

Figure 10A:
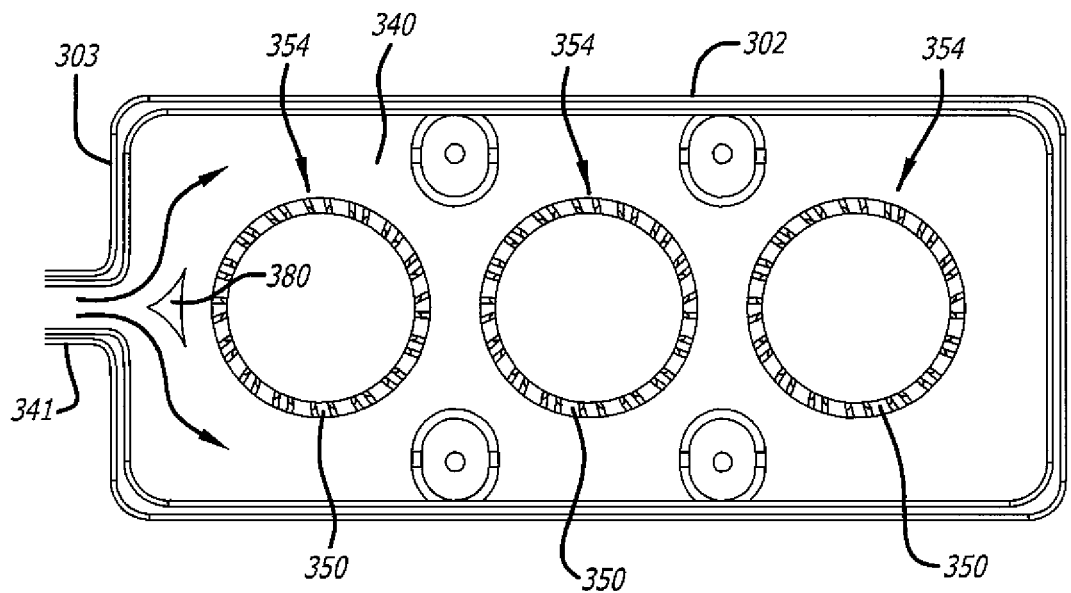
FIG. 10A is a schematic illustration of an alternate construction for the intake and exhaust chambers according to this specification.
Figure 10B:
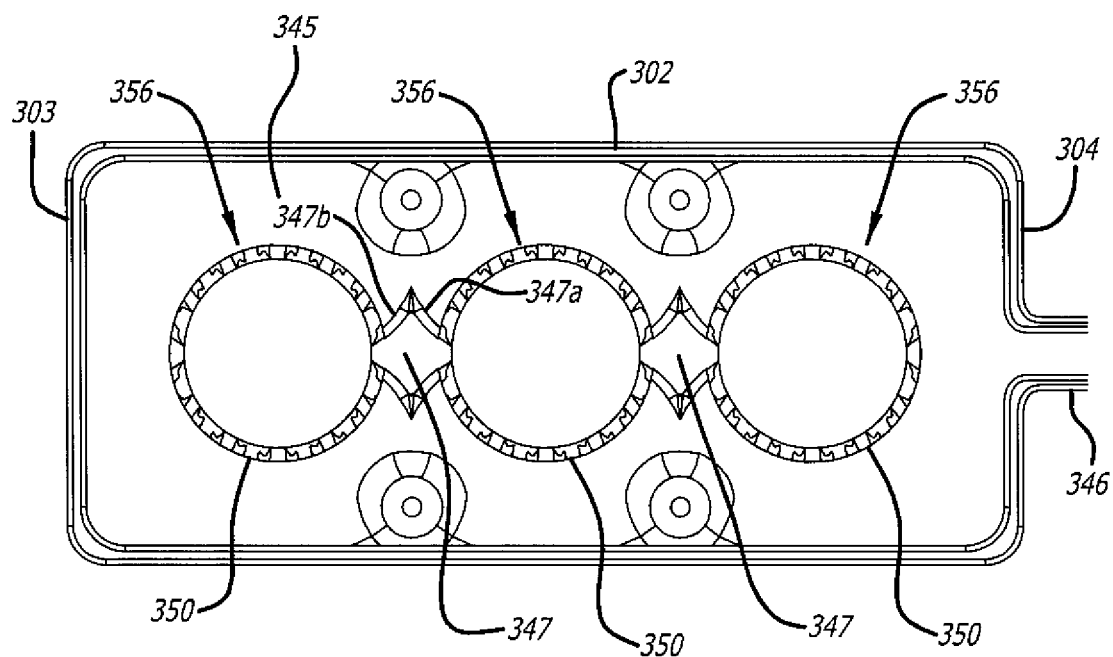
FIG. 10B is a schematic illustration of an alternate construction for an exhaust chamber according to this specification.

Other chamber constructions for inline opposed-piston engines are possible. These alternatives may be formed as elongate, open galleries or chests inside the cylinder block; however, inlet and exhaust openings are through one or both ends of the cylinder block. Thus, as per FIG. 10A, an opposed-piston engine includes a cylinder block 302 with inline cylinders 350 and an open intake chamber 340. The open intake chamber has a single air inlet 341 formed in one end 303 of the cylinder block. In some instances, an air flow deflector post 380 may be situated in the intake chamber 340, between the air inlet 341 and the cylinder intake ports 354, and positioned to deflect air flowing into the intake chamber from the air inlet toward opposing sides of the intake chamber. As per FIG. 10B, the same cylinder block 302 includes an open exhaust chamber 345. The open exhaust chamber has a single exhaust outlet 346 formed in a second end 304 of the cylinder block that opposes the first end 303. In some instances, the exhaust chamber 345 may include shaped exhaust deflectors 347. Preferably each deflector is formed as a post that extends between the floor and ceiling of the exhaust chamber 345. The exhaust deflectors 347 are positioned between adjacent cylinders 350, in the vicinity of the cylinders' exhaust areas. The shapes of the exhaust deflectors 347 include pairs of surfaces 347a and 347b that meet at an angle to form an edge facing one side of the cylinder block 302. For example, the cross-sectional shape of an exhaust deflector may be rhombus-like. The surfaces 347a and 347b are angled to deflect exhaust gas being discharged from one exhaust port away from the adjacent cylinder.

Thus, the new arrangement of open intake and exhaust chambers results in a lighter, more compact opposed-piston engine, improves mass flow through the cylinders, and supports trade-offs between mass flow through the air handling system and compactness of the engine. Various changes may be made in the details disclosed in this specification without departing from the invention or sacrificing the advantages thereof.

The invention claimed is:

1. An air handling system for an opposed-piston engine having a cylinder block with a plurality of cylinders arranged inline, in which each of the plurality of cylinders includes an inlet port longitudinally separated from a cylinder exhaust port, comprising:
   an exhaust chamber within the cylinder block including at least one exhaust outlet opening through the cylinder block;
   all of the cylinder exhaust ports being contained in the exhaust chamber to discharge exhaust thereinto; and,
   at least one exhaust deflector situated in the exhaust chamber, between adjacent the cylinder exhaust ports, and including surfaces angled to deflect exhaust being discharged into the exhaust chamber from the exhaust port of one cylinder away from the cylinder exhaust port of an adjacent cylinder.

2. An air handling system for an opposed-piston engine having a cylinder block with a plurality of cylinders aligned in one row, in which each cylinder includes an intake port longitudinally separated from an exhaust port, comprising:
   an open intake chamber in the cylinder block including at least one air inlet opening through the cylinder block;
   all of the cylinder intake ports being contained in the intake chamber to receive charge air therein;
   a plurality of first support posts extending between a floor and a ceiling of the intake chamber;
   an open exhaust chamber in the cylinder block including at least one exhaust outlet opening through the cylinder block;
   all of the cylinder exhaust ports being contained in the exhaust chamber to discharge exhaust thereinto; and,
   a plurality of second support posts extending between a floor and a ceiling of the exhaust chamber.

3. An air handling system according to claim 1, further including an air flow manifold in fluid communication with the at least one air inlet.

4. An air handling system according to claim 3, in which:
   a first air inlet opens through a first side of the cylinder block and a second air inlet opens through a second side of the cylinder block that is opposite the first side; and,
   the air flow manifold includes a first portion disposed on the first side of the cylinder block in fluid communication with the first air inlet and a second portion disposed on the second side of the cylinder block in fluid communication with the second air inlet.

5. An air handling system according to claim 4, in which the first and second manifold portions extend past an end of the cylinder block and join into a single conduit beyond the end.

6. An air handling system according to claim 1, in which the one or more air inlets includes an air inlet opening through an end of the cylinder block.

7. An air handling system according to claim 6, further including an air flow deflector situated in the intake chamber, between the air inlet and the cylinder intake ports, and positioned to deflect air flowing into the intake chamber from the air inlet toward opposing sides of the intake chamber.

8. An air handling system according to claim 1, further including an exhaust flow manifold in fluid communication with the one or more exhaust outlets.

9. An air handling system according to claim 8, in which:
   a first exhaust outlet opens through a first side of the cylinder block and a second exhaust outlet opens through a second side of the cylinder block that is opposite the first side;
   the exhaust manifold includes a first portion disposed on the first side of the cylinder block in fluid communication with the first exhaust outlet and a second portion disposed on the second side of the cylinder block in fluid communication with the second exhaust outlet; and,
   the first and second manifold portions extend past a first end of the cylinder block and join into a single conduit beyond the first end.

10. An air handling system according to claim 9, further including an air flow manifold on the cylinder block in fluid communication with the at least one air inlet.

11. An air handling system according to claim 10, in which:
a first air inlet opens through a the first side of the cylinder block and a second air inlet opens through the second side of the cylinder block;
the air flow manifold includes a first portion disposed on the first side of the cylinder block in fluid communication with the first air inlet and a second portion disposed on the second side of the cylinder block in fluid communication with the second air inlet.

12. An air handling system according to claim 11, in which the first and second manifold portions extend past a second end of the cylinder block opposite the first end and join into a single conduit beyond the second end.

13. An air handling system according to claim 1, in which the one or more exhaust outlets includes an exhaust outlet opening through an end of the cylinder block.

14. An air handling system according to claim 1, in which the at least one exhaust outlet includes a first exhaust outlet in fluid communication with a turbine input and a second exhaust outlet in fluid communication with an EGR input.

15. An air handling system according to claim 14, in which the first and second exhaust outlets are positioned in one of opposing sides of the exhaust chamber and opposing ends of the exhaust chamber.

16. An air handling system according to claim 14, in which the first and second exhaust outlets are positioned in one of a single side of the exhaust chamber and a single end of the exhaust chamber.

17. An air handling system according to claim 1, further comprising at least one exhaust deflector situated in the exhaust chamber, between adjacent cylinder exhaust ports, and including surfaces angled to deflect exhaust being discharged into the exhaust chamber from the exhaust port of one cylinder away from the exhaust port of an adjacent cylinder.

18. An air handling method for an opposed-piston engine having a cylinder block with a plurality of cylinders aligned in one row, in which each cylinder includes an inlet port longitudinally separated from an exhaust port with an open intake chamber in the cylinder block including at least one air inlet opening through the cylinder block, all of the cylinder intake ports being contained in the intake chamber to receive charge air therein, a plurality of first support posts extending between a floor and a ceiling of the intake chamber, an open exhaust chamber in the cylinder block including at least one exhaust outlet opening through the cylinder block, and all of the cylinder exhaust ports being contained in the exhaust chamber to discharge exhaust thereinto, and a plurality of second support posts extending between a floor and a ceiling of the exhaust chamber, the method comprising:
during an engine operation,
feeding compressed air into the intake chamber;
receiving compressed air through all cylinder intake ports positioned in the intake chamber; and,
discharging exhaust through all of the cylinder exhaust ports into the exhaust chamber.

19. The air handling method of claim 18, further including deflecting exhaust being discharged into the exhaust chamber from the exhaust port of one cylinder away from the exhaust port of an adjacent cylinder.

\* \* \* \* \*

UNITED STATES PATENT AND TRADEMARK OFFICE
CERTIFICATE OF CORRECTION

PATENT NO. : 9,551,220 B2  
APPLICATION NO. : 14/284134  
DATED : January 24, 2017  
INVENTOR(S) : Kevin Fuqua et al.

Page 1 of 1

It is certified that error appears in the above-identified patent and that said Letters Patent is hereby corrected as shown below:

In the Claims

-- Column 9, Claim 1, Line 61, replace "inlet" with "intake" --

-- Column 10, Claim 1, Line 2, delete "the" --

-- Column 10, Claim 1, Line 4, change "from the exahuast" to read "from the cylinder exhaust" --

-- Column 10, Claim 3, Line 25, change "claim 1" to read "claim 2" --

-- Column 10, Claim 6, Line 42, change "claim 1" to read "claim 2" --

-- Column 10, Claim 8, Line 51, change "claim 1" to read "claim 2" --

-- Column 11, Claim 13, Line 18, change "claim 1" to read "claim 2" --

-- Column 11, Claim 14, Line 21, change "claim 1" to read "claim 2" --

-- Column 11, Claim 17, Line 33, change "claim 1" to read "claim 2" --

-- Column 12, Claim 18, Line 8, replace "inlet" with "intake" --

-- Column 12, Claim 18, Line 9, change "an exhaust port with an open" to read "an exhaust port, an open" --

-- Column 12, Claim 18, Line 17, delete "and" --

Signed and Sealed this  
Fourth Day of July, 2017

Joseph Matal  
*Performing the Functions and Duties of the*  
*Under Secretary of Commerce for Intellectual Property and*  
*Director of the United States Patent and Trademark Office*